United States Patent

Weetman

(10) Patent No.: US 7,676,295 B2
(45) Date of Patent: Mar. 9, 2010

(54) PROCESSING INFORMATION MANAGEMENT IN A PLASMA PROCESSING TOOL

(75) Inventor: Chad R. Weetman, Newark, CA (US)

(73) Assignee: Lam Research Corporation, Fremont, CA (US)

(*) Notice: Subject to any disclaimer, the term of this patent is extended or adjusted under 35 U.S.C. 154(b) by 864 days.

(21) Appl. No.: 11/061,414

(22) Filed: Feb. 18, 2005

(65) Prior Publication Data

US 2006/0187713 A1     Aug. 24, 2006

(51) Int. Cl.
     *G06F 19/00*     (2006.01)
(52) U.S. Cl. .................. 700/110; 700/95; 700/96; 700/108; 700/109; 700/121
(58) Field of Classification Search ............. 700/95–96, 700/108–110, 121
See application file for complete search history.

(56) References Cited

U.S. PATENT DOCUMENTS

| 6,000,830 | A | 12/1999 | Asano et al. | |
|---|---|---|---|---|
| 6,363,294 | B1 * | 3/2002 | Coronel et al. | 700/121 |
| 6,415,193 | B1 | 7/2002 | Betawar et al. | |
| 6,735,493 | B1 | 5/2004 | Chou et al. | |
| 6,823,341 | B1 * | 11/2004 | Dietz | 707/100 |
| 6,826,443 | B2 * | 11/2004 | Makinen | 700/121 |
| 6,839,713 | B1 * | 1/2005 | Shi et al. | 707/101 |
| 7,054,699 | B2 * | 5/2006 | Nakamura | 700/95 |
| 7,113,838 | B2 * | 9/2006 | Funk et al. | 700/108 |

OTHER PUBLICATIONS

"International Preliminary Report on Patentability", mailed Nov. 15, 2007, for Application No. PCT/US2006/005802; Filed on Feb. 16, 2006; inventors: Lam Research Corporation.
"International Search Report", date mailed Oct. 17, 2007, International Application No. PCT/US06/05802; Filed on Feb. 16, 2006; Applicants: Lam Research Corporation.
"Written Opinion", date mailed Oct. 17, 2007, International Application No. PCT/US06/05802; Filed on Feb. 16, 2006; Applicants: Lam Research Corporation.

* cited by examiner

*Primary Examiner*—Michael D Masinick
(74) *Attorney, Agent, or Firm*—IP Strategy Group, P.C.

(57) ABSTRACT

A computer-implemented method for managing substrate processing data. Substrate process data is acquired while a substrate is processed in a plasma-processing chamber of a cluster tool. The method includes receiving meta-data that identifies at least one of an identification of the substrate and a process. The method further includes receiving from transducers process data streams, each of the process data streams pertaining to a process parameter being monitored. Individual data items in each of the process data streams are being collected in accordance to one of a first methodology and a second methodology. The first methodology represents data collection that is periodic in time. The second methodology represents data collection that happens when predefined events occur. The method also includes storing individual data items associated with process data streams in a single file. The single file stores only data pertaining to a single recipe used to process the substrate.

20 Claims, 6 Drawing Sheets

FIGURE 2 (Prior Art)

202 SUBSTRATE ID

| VALUE | TIME |
|---|---|
| SUBSTRATE123 | 9:58:09:015 |
| SUBSTRATE124 | 10:05:06:000 |

202a, 202b, 112

204 LOT ID

| VALUE | TIME |
|---|---|
| LOT 1A | 9:58:02:000 |
| LOT 1B | 11:10:09:000 |

204a, 204b

206 OCR

| VALUE | TIME |
|---|---|
| SERIAL # 768 | 9:56:03:864 |
| SERIAL # 983 | 10:03:39:146 |

206a, 206b

208 STEP NUMBER

| VALUE | TIME |
|---|---|
| 9 | 9:56:32:148 |
| 0 | 9:56:45:186 |
| 0 | 9:58:09:015 |
| 1 | 9:58:19:015 |
| 2 | 9:58:29:125 |

208a, 208b, 208c, 208d, 208e

210 PRESSURE

| VALUE | TIME |
|---|---|
| 50 | 9:58:08:811 |
| 54 | 9:58:09:011 |
| 58 | 9:58:09:211 |
| 79 | 9:58:09:411 |
| 88 | 9:58:09:611 |
| 100 | 9:58:09:811 |
| 101 | 9:58:10:011 |

210a, 210b, 210c, 210d, 210e, 210f, 210g

| SUBSTRATE ID | FILE ID |
|---|---|
| WAFER123 | 6 |
| WAFER124 | 7 |
| WAFER124 | 8 |
| WAFER124 | 63 |

404

| OCR ID | FILE ID |
|---|---|
| SERIALNUMBER768 | 6 |
| SERIALNUMBER983 | 7 |
| SERIALNUMBER983 | 8 |
| SERIALNUMBER983 | 63 |

410

| FILE ID | START TIME | END TIME | FILEPATH |
|---|---|---|---|
| 6 | 9:58:08:811 | 10:58:08:811 | ARCHIVE/TOOL1/MODULE1/FILETYPEA/1-11-05/FILE2 |
| 7 | 2:48:08:789 | 3:08:00:811 | ARCHIVE/TOOL1/MODULE1/FILETYPEA/1-12-05/FILE1 |
| 8 | 3:08:08:811 | 4:00:08:811 | ARCHIVE/TOOL1/MODULE2/FILETYPEA/1-12-05/FILE2 |
| 63 | 4:01:08:811 | 4:01:08:900 | ARCHIVE/TOOL1/MODULE2/FILETYPEA/1-12-05/FILE3 |

PROCESSING INFORMATION MANAGEMENT IN A PLASMA PROCESSING TOOL

BACKGROUND OF THE INVENTION

A cluster tool may consist of one or more plasma-processing chambers (i.e., module) and other components to facilitate substrate processing. Each plasma-processing chamber may have a plurality of transducers (i.e., sensors). Each transducer is able to detect specific process parameter (i.e., condition) of the plasma-processing chamber and/or other components of the tool. Examples of process parameters include, but are not limited to, temperature, pressure, step numbers, and gas flow.

A cluster tool interacts with data owners to collect substrate processing (SP) data as a substrate (i.e., wafer) is processed in a plasma-processing chamber. Substrate processing data refers to two types of data (i.e., meta-data and process data) that may be gathered. Meta-data are individual data items that identify a substrate (i.e., substrate id, lot id, etc.) or a process (i.e., recipe name, etc.). The other type of data, process data, relates to individual data items that pertain to process parameters (i.e., pressure, gas flow, step number, etc.) monitored by a plurality of transducers (i.e., sensors located in a cluster tool).

As discuss herein, data owner relates to a software interface that interacts with a data source to collect data pertaining to a cluster tool and its sub-components. Data source may include, but are not limited to, transducers that detect conditions of the cluster tool or its sub-components. The data gathered by transducers are generally known as process data. Also, data source may relate to pre-stored data (i.e., meta-data) that may include information about a substrate or a process. Data may be collected when changes occur in a plasma-processing chamber or periodically. Changes may include increases/decreases in temperature, pressure, gas flow, etc.

To facilitate discussion, FIG. 1 shows how data flows from a cluster tool to a database. In a cluster tool 102, data is collected by each data owner (104a, 104b, and 104c). The data that is collected by each data owner may be, for example, a name of a data point, absolute timestamps when changes occur, and a value for each absolute timestamp. For example, data owner 104a may be a software interface that interacts with a transducer that detects changes in pressure. Thus, data collected by data owner 104a may include pressure as the name of the data point, absolute timestamps when pressure changes occur, and a pressure value for each absolute timestamp.

Once the data has been gathered, a database interface 106 is notified by data owner (i.e., 104a) via path 108 that data are available for upload. Database interface 106 then sends the data to a database 112 via pipeline 110 to be stored. Database 112 may be located on cluster tool 102 or on a network server. Due to the sheer size of the data that may be collected by cluster tool 102, pipeline 110 may have to be fairly large in order to handle the large bandwidth required to transmit large amount of data to database 112.

The data that is created is stored on individual tables (114a, 114b, and 114c) on database 112. Each table is arranged according to the data owner. For example, table 114a stores information (such as data point, value, and absolute timestamp) gathered by data owner 104a, which monitors pressure changes. One common variable between these tables is absolute timestamp. More details about how absolute timestamps work among the various tables are provided in the discussion about FIG. 2.

FIG. 2 provides examples of tables that may exist in database 112. Each table stores data (i.e., data point, absolute timestamp, and value) about a specific process parameter or meta-data. For example, table 202 stores data about substrate id, table 204 stores data about lot id, table 206 stores data about optical character reader (OCR) id, table 208 stores data about step number, and table 210 stores data about pressure.

Since the data collected is not specific to a substrate, a user may have a difficult time reconstructing processing conditions for a specific substrate when an issue arises. To reconstruct the processing conditions, the user may first have to determine when the substrate entered a plasma-processing chamber. Once the user has the absolute timestamp (i.e., 202a or 202b) at which time the substrate entered the plasma-processing chamber, the user is then able to use that absolute timestamp to compare it against absolute timestamps (i.e., 204a, 204b, 206a, 206b, 208a, 208b, 208c, 208d, 208e, 210a, 210b, 210c, 210d, 210e, 210f, 210g) on the other tables. However, the absolute timestamps on the other tables may not produce a perfect match. A reason for a lack of a perfect match may relate to how data stored on each of the tables is collected when there is a change in a processing parameter.

For example, substrate B enters a plasma-processing chamber after substrate A has already begun its processing cycle in the same cluster tool. When substrate B enters the plasma-processing chamber, data owner for substrate id collects data indicating that substrate B has entered the processing environment. Meanwhile, the data owner for pressure acquires a multitude of data points because changes in pressure are happening for both substrates. As a result, the absolute timestamp that is recorded on the substrate id table may not match up perfectly with any of the absolute timestamps on the pressure table because the pressure for substrate A is changing at the same time that the pressure for substrate B is beginning to change.

For example, a user is researching a problem with substrate 123. Looking at substrate id table 202, the user is able to determine that substrate 123 entered a plasma-processing chamber at an absolute timestamp 202a of 9:58:09:015. Since the common variable on each of the tables is the absolute timestamp, the user then uses absolute timestamp 202a as a guiding post for retrieving data from the other tables by comparing absolute timestamp 202a against the absolute timestamps on the other tables. In some situations, the user is able to extract the relevant values since absolute timestamp 202a matches the absolute timestamps on the other tables. For example, absolute timestamp 202a matches absolute timestamp 208c on step number table 210.

However, absolute timestamps may not always match on all the tables. Under that situation, the user may have to interpolate based on values corresponding to the absolute timestamps that exist on the tables. For example, absolute timestamp 202a does not match any of the absolute timestamps on pressure table 210. Instead absolute timestamp 202a falls between absolute timestamp 210b and absolute timestamp 210c. Even though the user may be able to determine the range (i.e., actual pressure value falls between 59 and 68 millitorrs), the user may find it difficult to determine an actual value.

There are several problems with the current methods for collecting data from a cluster tool. First, data may not always be readily accessible since the data may be stored locally on a cluster tool or on a network server. To retrieve the data, a user may need to have access to the cluster tool or network server.

Second, data is currently collected on a time slide, grouped by data owners, and is stored on the database as individual tables. For example, data about pressure is stored together on a single table whereas data about gas flow is stored on a different table. To reconstruct processing conditions for a specific substrate may take some time since data for a specific substrate is not readily available.

Third, due to the way data is stored, a user may not be able to automatically request for data without having to do some analysis to determine the usability of the data. Further, since data for a substrate is stored across multiple tables, a user may have to use multiple queries to extract the data needed. Since the common variable among the tables is the absolute timestamp, data that is gathered may not always give an accurate picture of what has occurred since the user may have to synchronize the data on the various tables. As a result, the accuracy and quality of the data may be lacking.

SUMMARY OF INVENTION

The invention relates, in an embodiment, to a computer-implemented method for managing substrate processing data. The substrate process data is acquired while a substrate is processed in a plasma-processing chamber of a cluster tool. The method includes receiving meta-data that identifies at least one of an identification of the substrate and a process. The method further includes receiving from a plurality of transducers a plurality of process data streams, each of the plurality of process data streams pertaining to a process parameter being monitored. Individual data items in each of the plurality of process data streams are being collected in accordance to one of a first methodology and a second methodology. The first methodology represents data collection that is periodic in time. The second methodology represents data collection that takes place when predefined events occur. The method also includes storing the individual data items associated with the plurality of process data streams in a single file. The single file stores only the substrate process data pertaining to a single recipe that is employed to process the substrate.

In yet another embodiment, the invention relates to a computer-implemented method for managing substrate processing data. The substrate processing data is acquired while a substrate is processed in a plasma-processing chamber of a cluster tool. The method includes receiving meta-data associated with the substrate. The meta-data identifies a process recipe employed to process the substrate. The method further includes receiving from a plurality of transducers a plurality of process data streams, each of the plurality of process data streams pertaining to a process parameter being monitored. The method also includes employing a single file for storing the individual data items associated with the plurality of process data streams and the meta-data. The single file is not employed for storing substrate process data associated with other recipes. The single file is also not employed for storing substrate process data associated with other substrates.

In yet another embodiment, the invention relates to an article of manufacture including a program storage medium having computer readable code embodied therein. The computer readable code is configured for managing substrate processing data in a substrate processing environment. The substrate processing data is acquired while a substrate is processed in a plasma-processing chamber of a cluster tool. The article of manufacture includes computer readable code for receiving meta-data associated with the substrate. The meta-data identifies a process recipe employed to process the substrate. The article of manufacture further includes computer readable code for receiving from a plurality of transducers a plurality of process data streams, each of the plurality of process data streams pertaining to a process parameter being monitored. The article of manufacture also includes computer readable code for storing the individual data items associated with the plurality of process data streams and the meta-data in a single file. The single file is not employed for storing substrate process data associated with other recipes. The single file is also not employed for storing substrate process data associated with other substrates.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 shows, in the prior art, example of tables that may exist in a database. Each table stores data about a specific process parameter or meta-data.

FIG. 4A shows, in an embodiment of the invention, indexes of individual data items on an archive database

DETAILED DESCRIPTION OF EMBODIMENTS

Figure 1:
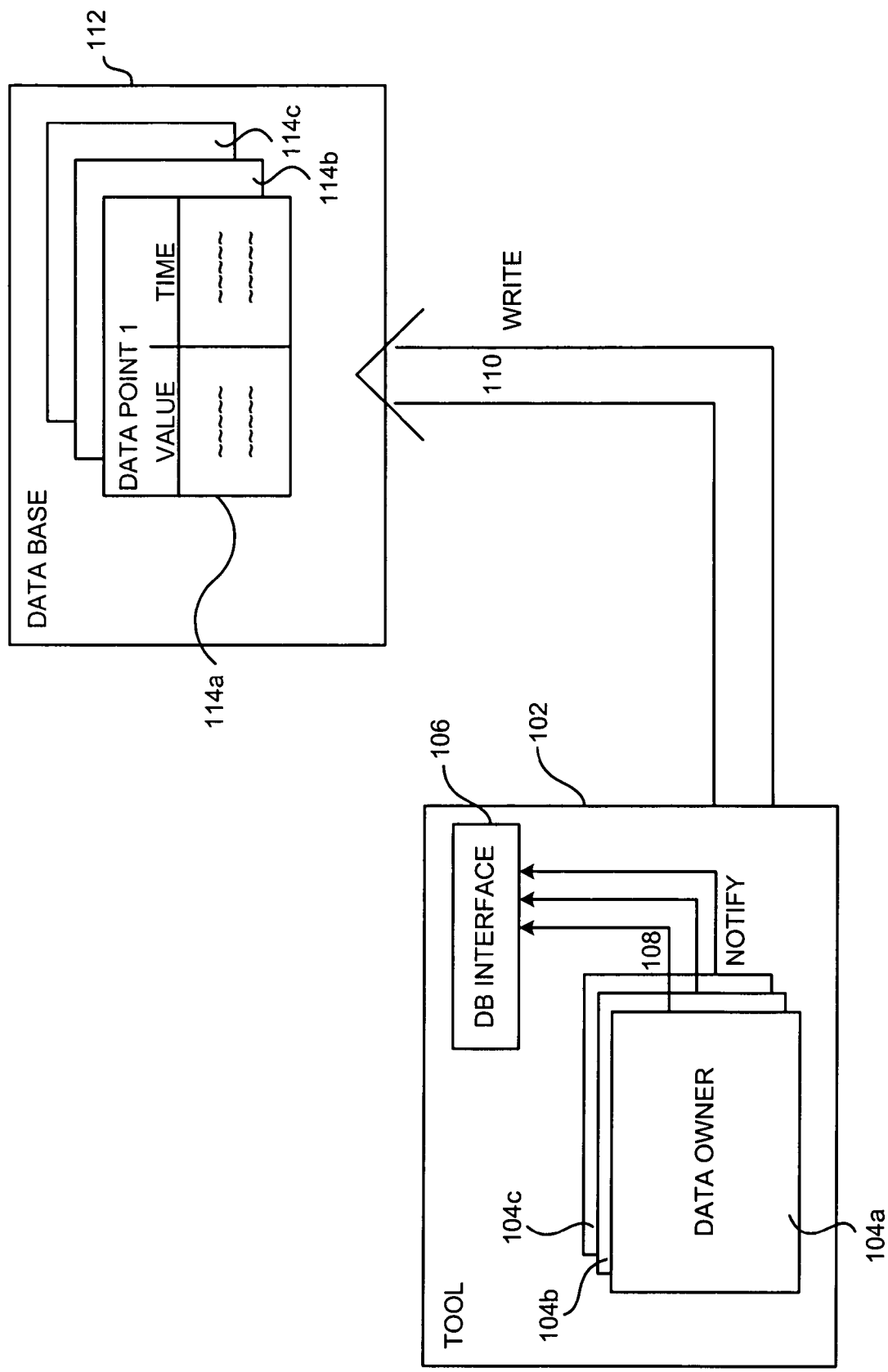
FIG. 1 shows, in the prior art, how data flows from a cluster tool to a database.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there are provided computer-implemented methods for collecting meta-data and process data from a substrate processing environment while the substrate (i.e., wafer) is processed in a plasma-processing chamber (i.e., module) of a cluster tool. As discuss herein, a substrate processing environment includes equipments associated with processing substrates, including the cluster tool, supporting servers and computers, interfaces that manage the movement of individual data items, and applications that may interact with the individual data items.

As discussed herein, meta-data relates to individual data items that identify a substrate (i.e., substrate id, lot id, etc.) or a process (i.e., recipe name, etc.). Also, as discussed herein, process data relates to individual data items that pertain to process parameters (i.e., pressure, gas flow, step number, etc.) monitored by a plurality of transducers (i.e., sensors located in a cluster tool). Together, meta-data and process data form the substrate processing data. Individual data items from a single recipe that is employed to process a single substrate are stored as a single file. The single file is uploaded to a process control computer, is stored and indexed into an archive database, and is made readily available for analysis or review.

For example, a substrate is etched in a plasma-processing chamber of a cluster tool. In the plasma-processing chamber, there is a plurality of transducers that receives a plurality of process data streams. Each of the process data streams pertains to a process parameter (i.e., pressure, temperature, step number, etc.) that is monitored. Process data associated with each of the plurality of process data streams for a substrate of a single recipe are collected and stored as a single file. Also, on the single file is the meta-data that is collected by the cluster tool for that specific substrate undergoing that specific recipe.

In an embodiment of the invention, the methodology used to collect individual data items may be either synchronous or asynchronous. The methodology is synchronous if individual data items are collected periodic in time. For example, a transducer may be scheduled to receive process data streams at a specific interval (i.e., every ten seconds) regardless of activities. The methodology is asynchronous if individual data items are collected upon occurrence of predefined events (such as a change in a process parameter).

The individual data items collected may be stored as a single file, in which the single file pertains to process data and meta-data that are related to a single recipe used to process a substrate. In an embodiment of the invention, a single file may be uploaded to a real-time process control computer (i.e., server) as a substrate is processed to enable a user to monitor for process irregularities. In another embodiment of the invention, a single file may be uploaded to a process control computer after a single recipe for a substrate has completed.

Once uploaded to the process control computer, the single file is managed by an equipment information management system (EIMS). As discussed herein, an EIMS is an interface that manages individual data items and directs communications relating to individual data items to relevant party(s). In an embodiment, an EIMS sends a single file to an archive database, which may be a relational database.

The archive database indexes the individual data items, which allows the individual data items to be searched quickly in subsequent searches. By indexing the individual data items, a user is able to easily obtain individual data items related to a single substrate of a single recipe without having to go through a multitude of steps to reconstruct the substrate processing environment.

The archive database also stores the single file into a processing data hierarchy. The process data hierarchy includes files stored as leaf nodes in a tree-like storage arrangement (i.e., file directory). The tree-like storage arrangement makes navigation among the files more accessible for a user when files need to be retrieved.

In another embodiment, an EIMS also notifies an application when specific individual data items, which an application has requested for, are available. The EIMS may also compress and push the individual data items to the application when the individual data items have been stored and indexed on an archive database.

The EIMS may also provide the individual data items to a customer application. Prior to pushing the individual data items to the customer application, the EIMS may send the individual data items to a data adapter to translate individual data items into a format that is suitable for use by the customer application. As discussed herein, a data adapter is a software interface that reformats individual data items into specific format as requested by the customer application.

To facilitate discussion, the following example provides an overview of how embodiments of the invention may work. Assume a specific substrate file is needed by an application. The application registers with an EIMS by identifying what type of individual data items the application is looking for. The EIMS then forwards the request to a database interface module, which may be located on a cluster tool. Meanwhile, a substrate is loaded onto a plasma-processing chamber in the cluster tool to be processed. While the substrate is processed, individual data items are collected and stored on a single file.

The database interface module is notified that a single file is available for upload onto a process control computer. The database interface module may compress and push the individual data items onto the process control computer. At the same time, the database interface module may notify the EIMS that a single file with the individual data items, which has been requested by the application, has been created.

Once the single file has been written to the process control computer, the EIMS reads the file and pushes the individual data items to an archive database. The archive database stores and indexes the single file. Once indexing has completed, the EIMS notifies the application that the requested individual data items are available and EIMS may compress and push the individual data items to the application. At the same time, the EIMS may push the individual data items to a customer application in a format that is usable by the customer application. To convert the individual data items into a format that the customer application is able to use, the individual data items may first go through a data adapter.

Figure 3:
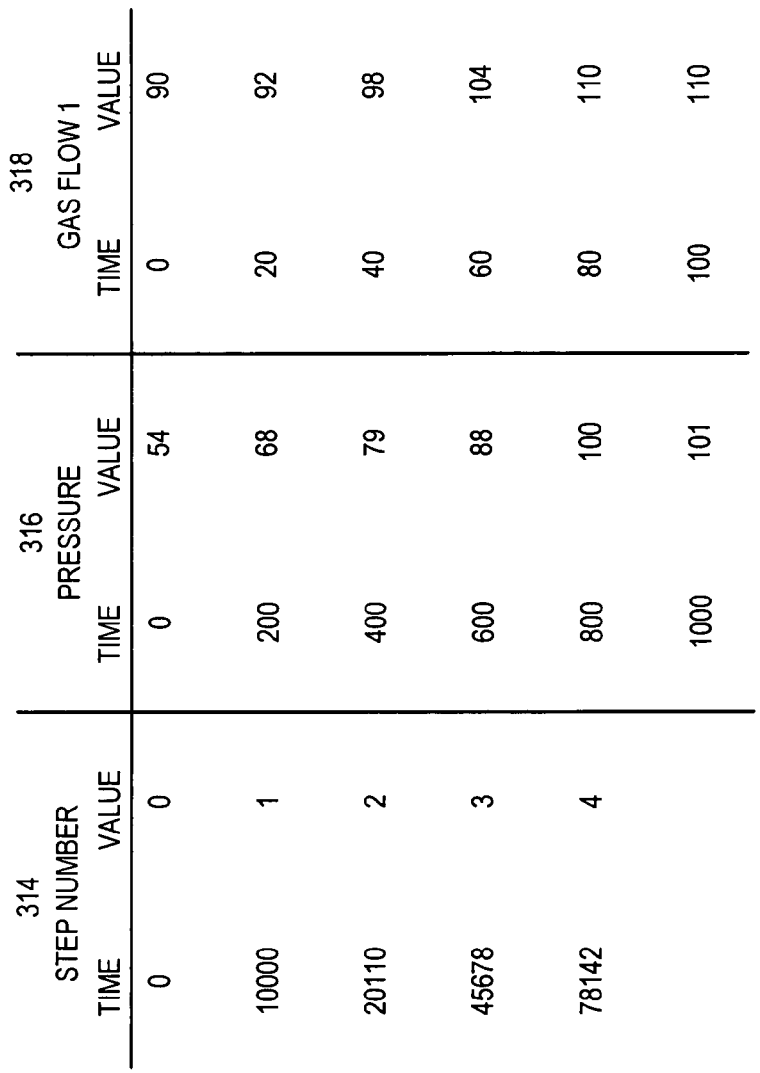
FIG. 3 shows, in an embodiment of the invention, an example of individual data items in a single file.

The features and advantages of the present invention may be better understood with reference to the figures and discussions that follow. FIG. 3 shows, in an embodiment of the invention, an example of individual data items in a single file. A file 300 includes individual data items that may be process data or meta-data.

Individual data items may include substrate id 302 (the id of the substrate), lot id 304 (substrates are grouped together using the same recipe), OCR id 306 (serial number on a substrate), notch angle 308 (number on a substrate that is used to align substrate the same way for every steps throughout a single recipe), recipe start time 310 (time a process begins) and recipe end time 312 (time a process ends). Individual data items may further include step number 314, a pressure 316, and a gas flow 318.

The type of data that is collected may include data point (i.e., type of processing parameter), relative time interval, and a value associated with that relative time interval. For example, for pressure 316, at 0 time interval (at the recipe start time), the value at 0 time interval has been recorded as 54 millitorrs. At 200 milliseconds later (200 milliseconds after the recipe start time), the value has changed to 68 millitorrs. Taking recipe start time 310 (recipe start time is 10:04:38: 070), the user is able to calculate the time (10:04:38:270) at which the pressure changed to 68 millitorrs given the relative time interval.

As mentioned above, individual data items may be collected periodically or they may be collected due to predefined events. The example in FIG. 3 shows that more process data is collected for gas flow 318 than pressure 316. This example illustrates process data being collected due to predefined events (such as changes to process parameters) and not at a specific time interval.

Individual data items collected on a single substrate for a single recipe are stored as a single file. The single file is loaded onto a process control computer and from there may be stored in an archive database. Individual data items saved on an archive database are indexed to enable more effective searching. Also, individual data items saved on the archive database may be stored in a tree-like storage arrangement (i.e., directory), which allows for visual organization of the files.

To facilitate discussion, FIG. 4A shows, in an embodiment of the invention, indexes of individual data items on an archive database. The indexes shown are examples and are not meant to be all inclusive of the possible indexes that may exist in the archive database. Index 404 includes individual data items about substrate id and file id. Index 410 includes individual data items about OCR id and file id. Index 416 includes individual data items about file id, start time, end time, and file path.

For example, a user queries an archive database to retrieve a file related to substrate 123. Since individual data items stored on the archive database is indexed, the system is able to quickly determine that substrate 123 has a file id of 6, which is stored at the following path: Archive/tool1/module1/filetypeA/1-11-05/file2. In another example, a user queries an archive database to locate files related to substrate 124. Since the archive database is an indexed database, the system is able to quickly locate 3 file ids related to this single substrate.

There are 3 file ids related to substrate 124 because there are three different files for this single substrate. A substrate may have more than one file depending on what is stored on the file. For example, substrate 124 has been etched twice, once in plasma-processing chamber 1 and the other time in plasma-processing chamber 2. As a result, two files are created for substrate 124. The first file (Archive/tool1/module1/filetypeA/1-12-05/file1) provides the individual data items for when substrate 124 was in plasma-processing chamber 1. The second file (Archive/tool1/module2/filetypeA/1-12-05/file2) provides the individual data items for when substrate 124 was in plasma-processing chamber 2. The third file for substrate 124 may be a maintenance log that is produced when substrate 124 has completed processing in plasma-processing chamber 2 (Archive/tool1/module2/filetypeA/1-12-05/file3).

Figure 4B:
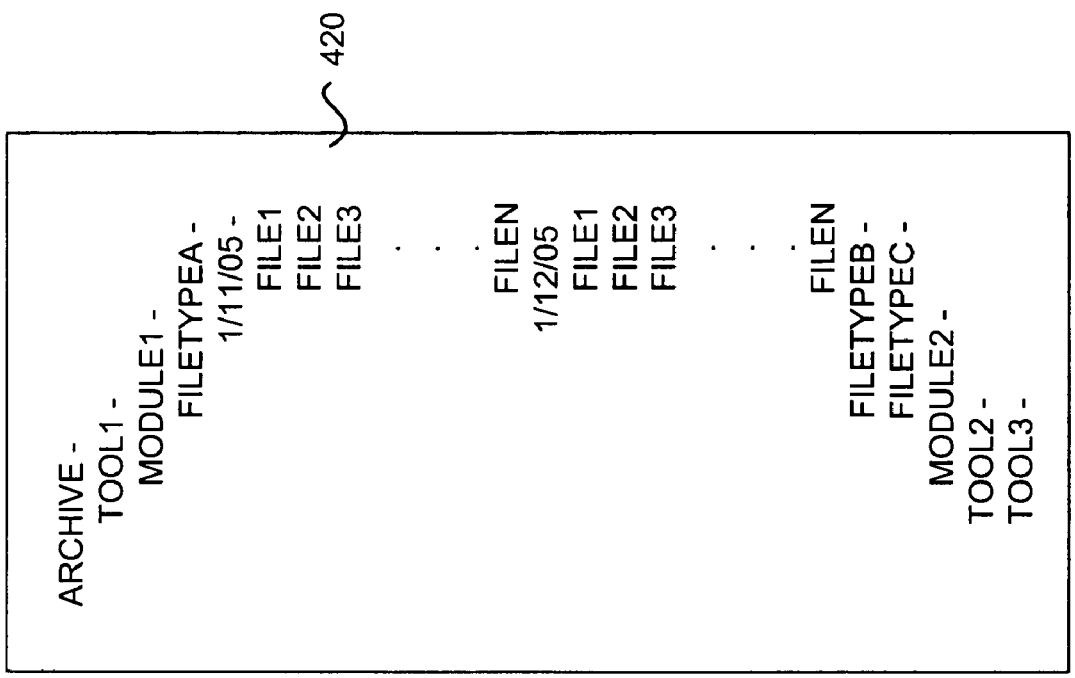
FIG. 4B shows, in an embodiment of the invention, a processing data hierarchy.

Files may also be organized into a processing data hierarchy, where the files are stored as leaf nodes in a tree-like storage arrangement. For example, each filepath in index 416 (i.e., Archive/tool1/module2/filetypeA/1-12-05/file3) is a leaf node in the tree-like storage arrangement. FIG. 4B shows, in an embodiment of the invention, a processing data hierarchy 420. The files are first grouped by date (parent level). At the next level up (grand-parent level), the files are grouped by file type. File type may include, but is not limited to procedure data log, spectrum data, history data log, and maintenance data log.

At the grand-grand-parent level, the files are grouped by module ID (i.e., plasma-processing chamber). For example, a cluster tool has 4 plasma-processing chambers. The files are grouped by which plasma-processing chambers handled the processing. At the highest level (grand-grand-grand-parent level), the files are grouped together by tool ID (cluster tool).

For example, substrate A has been processed by plasma-processing chamber 1 of a Lam 2300 cluster tool on Jan. 25, 2005. Meanwhile, on the same date, substrate B has been processed by plasma-processing chamber 2 of the same Lam 2300 cluster tool. Thus, the single file created for substrate A is stored in the processing database hierarchy under Lam 2300 (tool 1), plasma-processing chamber 1 (module 1), procedure data log (file type), Jan. 25, 2005 (date). While, the single file created for substrate B is stored in the processing database hierarchy under Lam 2300 (tool 1), plasma-processing chamber 2 (module 2), procedure data log (file type), Jan. 25, 2005 (date).

In an embodiment of the invention, a tree-like storage arrangement (i.e., directory) is navigable on a display screen (i.e., computer monitor) by a user employing a navigation interface. The navigation interface allows the user to view the tree-like storage arrangement and to choose any leaf node (file) for viewing.

Figure 5:
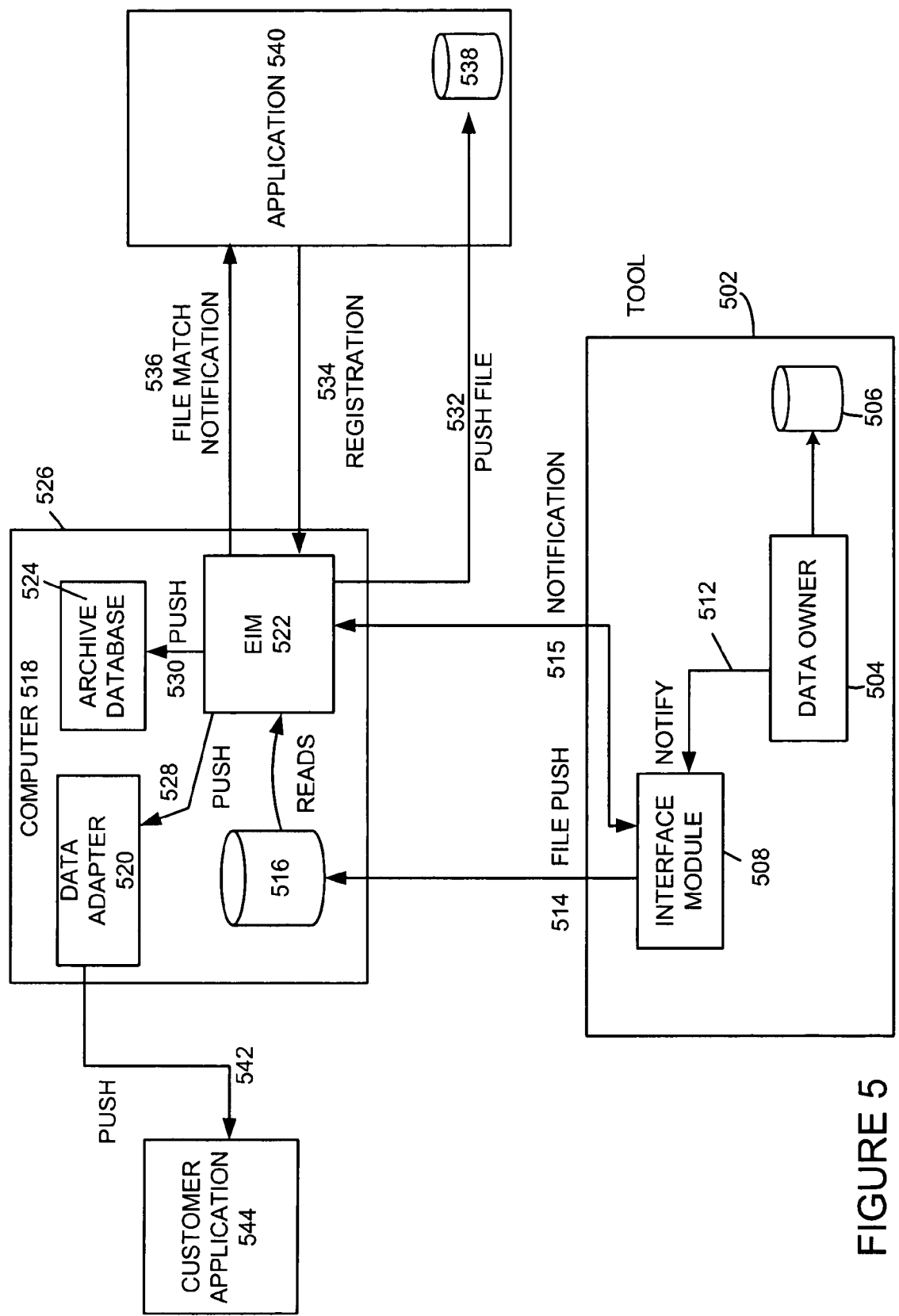
FIG. 5 shows, in an embodiment of the invention, an overall view of the process.

To better understand how the whole process works, FIG. 5 shows, in an embodiment of the invention, an overall view of the process. A single recipe is employed to process a substrate. While the single substrate is processed in a cluster tool 502, a data owner 504 collects process data and meta-data and writes the individual data items to a file 506.

As mentioned above, data owner relates to a software interface that interacts with a data source to collect data pertaining to a cluster tool and its sub-components. Data source may include, but are not limited to, transducers that detect conditions of the cluster tool and/or its sub-components. Data source may also relate to pre-stored data that may include information about a substrate or a process.

Once file 506 has been created, data owner 504 notifies an interface module 508 via path 512 that file 506 has been created. Upon receipt of the notification, interface module 508 may compress and push file 506 to a process control computer 518 via path 514. In an embodiment of the invention, a single file may be loaded immediately to a real-time process control computer. By uploading the single file as process data streams are received, a user is able to monitor the process for irregularities. In another embodiment of the invention, a single file may be uploaded to a process control computer after a single recipe for a substrate has completed.

Meanwhile, interface module 508 may also notify an EIMS 522 via path 515 that a file has been created. For example, an application 540 needs a specific file. Application 540 registers (534) with EIMS 522 the type of file that is needed. EIMS 522 then notifies interface module 508 that application 540 is waiting for a specific file. Once the requested file is available, interface module 508 notifies EIMS 522 that a file has been created.

Once EIMS 522 receives the notification, EIMS 522 waits for file 506 to be written to process control computer 518 as file 516. Once the upload has completed, EIMS 522 reads and pushes file 516 via path 530 to an archive database 524. Archive database 524 opens the file and updates the indexes with the new individual data items collected. Once archive database 524 has completed the index process, EIMS 522 pushes file 516 via path 532 to application 540 as file 538 and notifies application 540 via path 536 that file 538 is available.

At the same time, EIMS 522 may push the individual data items to a customer application 544. Individual data items may be pushed upon request or when the individual data items meet certain specifications that have been pre-programmed. Before pushing the individual data items to customer application 544, the individual data items are sent to a data adapter 520 via path 528. Data adapter 520 is a software interface that translates (i.e., reformats) individual data items to client's specifications. Once the individual data items have been translated, the individual data items are pushed via path 542 to customer application 544.

As can be appreciated from the foregoing, embodiments of the invention allow for individual data items to be collected on a per substrate per recipe basis instead of on a parameter time slide interval. By storing individual data items that pertain to a single recipe for a single substrate as a single file, a user is able to monitor a substrate for process irregularities. Also, data analysis may be quicker since interpolation or synchronization is not required. Further, a single file for individual data items related to a single recipe for a single substrate allows for quicker reconstruction of a processing environment at a later date. Additionally, a user is no longer burden with the challenge of separating unrelated data from individual data items that a user may need to analyze problems related to a specific substrate.

In addition, embodiments of the invention allow for individual data items to be indexed, which enable for quicker searches. User is able to easily access the individual data items without having to do multiple queries to pull relevant data. An embodiment of the invention also allows for individual data items to be sent to a customer application in a format that is suitable for the customer application's needs.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a substrate processing environment, a computer-implemented method for managing substrate processing data, said substrate process data being acquired while a substrate is processed in a plasma-processing chamber of a cluster tool, comprising:

receiving meta-data that identifies an identification of said substrate, said meta-data further identifying a process recipe employed for processing said substrate;

receiving from a plurality of transducers a plurality of process data streams, each of said plurality of process data streams pertaining to a process parameter being monitored, individual data items in each of said plurality of process data streams being collected;

storing said individual data items associated with said plurality of process data streams in a single table;

storing said single table and said meta-data in a single file, said single file storing data pertaining to only said process recipe and said substrate;

using a process control computer to receive a registration from an application, said registration identifying a file type needed by said application;

receiving, using said process control computer, a notification indicating that said single file in accordance with said file type has been created;

writing said single file to said process control computer as a written file;

updating indexes in a database with said individual data items;

after said updating, pushing said written file to said application as a pushed file via a first path;

after said updating, notifying said application via a second oath that said pushed file is available;

receiving second meta-data that identifies said identification of said substrate, said second meta-data further identifying a second process recipe employed for processing said substrate; and creating a second file for storing said second meta-data and a processing data set, said processing data set resulted from processing said substrate using said second process recipe.

2. The method of claim 1 further comprising providing said individual data items pertaining to said plurality of data streams substantially in real time to a real-time process control computer, said real-time process control computer being configured to analyze said individual data items while said substrate is processed to monitor for process irregularities.

3. The method of claim 1 further comprising storing said single file into an archive database, said storing including storing said individual data items associated with said plurality of data streams in a single file of said archive database.

4. The method of claim 1 further comprising creating a third file for storing a maintenance log when processing said substrate using said process recipe and said second process recipe has been completed.

5. The method of claim 1 further comprising placing said single file into a processing data hierarchy, said processing data hierarchy comprising files stored as leaf nodes in a tree-like storage arrangement, wherein date represents a parent level of said files, file types represent a grand-parent level of said files, module IDs represent a grand-grand-parent level of said files, and tool IDs represent a grand-grand-grand-parent level of said files.

6. The method of claim 5 wherein said tree-like storage arrangement is navigable on a display screen by a user employing a navigation interface, said navigation interface permitting said user to view said tree-like storage arrangement and to select any of said leaf nodes for viewing.

7. The method of claim 1 further comprising compressing said single file prior to said pushing.

8. The method of claim 1 further comprising furnishing said substrate process data to a customer application, said furnishing further including translating said single file into a format suitable for use by said customer application.

9. In a substrate processing environment, a computer-implemented method for managing substrate processing data, said substrate processing data being acquired while a substrate is processed in a plasma-processing chamber of a cluster tool, the method comprising:

receiving meta-data identifying said substrate, said meta-data further identifying a process recipe employed to process said substrate;

receiving individual data items pertaining to process parameters being monitored;

storing said individual data items in a singles table;

employing a single file for storing said single table and said meta-data, said single file not employed for storing substrate process data associated with other recipes, said single file also not employed for storing substrate process data associated with other substrates;

using a process control computer to receive a registration from an application, said registration identifying a file type needed by said application;

receiving, using said process control computer, a notification indicating that said single file in accordance with said file type has been created;

writing said single file to said process control computer as a second file;

updating indexes in a database with said individual data items;

after said updating, pushing said written file to said application as a pushed file via a first path; and after said updating, notifying said application via a second path that said pushed file is available.

10. The method of claim 9 further comprising providing said individual data items pertaining to said plurality of data streams substantially in real time to a real-time process control computer, said real-time process control computer being configured to analyze said individual data items while said substrate is processed to monitor for process irregularities.

11. The method of claim 9 further comprising storing said single file into an archive database, said storing including storing said individual data items associated with said plurality of data streams in a single file of said archive database.

12. The method of claim 9 further comprising creating a log file for storing a maintenance log when processing said substrate has using said process recipe has been completed.

13. The method of claim 9 further comprising placing said single file into a processing data hierarchy, said processing data hierarchy comprising files stored as leaf nodes in a tree-like storage arrangement, wherein date represents a parent level of said files, file types represent a grand-parent level of said files, module IDs representing a grand-grand-parent level of said files, and tool IDs representing a grand-grand-grand-parent level of said files.

14. The method of claim 13 wherein said tree-like storage arrangement is navigable on a display screen by a user employing a navigation interface, said navigation interface permitting said user to view said tree-like storage arrangement and to select any of said leaf nodes for viewing.

15. The method of claim 9 further comprising providing said single file to an application, said providing further including compressing said single file prior to transmitting to said application.

16. The method of claim 9 further comprising furnishing said substrate processing data to a customer application, said furnishing further including translating said single file into a format suitable for use by said customer application.

17. A method for processing at least a substrate in a plasma processing system, the method comprising:

receiving meta-data that identifies an identification of said substrate, said meta-data further identifying a first process recipe employed for processing said substrate in a first plasma processing chamber;

receiving data items pertaining to process parameters monitored when said substrate is processed in said plasma processing chamber with said first process recipe;

storing said meta-data and said data items in a single file, said single file not employed for storing substrate process data associated with other process recipes, said single file also not employed for storing substrate process data associated with other substrates;

using a process control computer to receive a registration from an application, said registration identifying a file type needed by said application;

receiving, using said process control computer, a notification indicating that said single file in accordance with said file type has been created;

writing said single file to said process control computer as a written file;

updating indexes in a database with said data items;

after said updating, pushing said written file to said application as a pushed file via a first path; and after said updating, notifying said application via a second path that said pushed file is available.

18. The method of claim 17 further comprising:

receiving second meta-data that identifies said identification of said substrate, said second meta-data further identifying a second process recipe employed for processing said substrate in a second plasma processing chamber; and creating a second single file for storing said second meta-data and a processing data set, said processing data set resulted from processing said substrate with said second process recipe in said second plasma processing chamber.

19. The method of claim 17 further comprising using said process control computer to notify an interface module that said application needs a file of said file type.

20. The method of claim 17 further comprising providing said data items to a customer application at the same time of performing said pushing and said notifying.

* * * * *

UNITED STATES PATENT AND TRADEMARK OFFICE
Certificate

Patent No. 7,676,295 B2 　　　　　　　　　　　　　　　　　　　　　Patented: March 9, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Chad R. Weetman, Newark, CA (US); Chung-Ho Huang, San Jose, CA (US); Jacqueline Seto, Mountain View, CA (US); and John Jensen, Alameda, CA (US).

Signed and Sealed this Twenty-fifth Day of May 2010.

KAMINI S. SHAH
*Supervisory Patent Examiner*
Art Unit 2128